(12) United States Patent
Cui et al.

(10) Patent No.: US 10,751,922 B2
(45) Date of Patent: Aug. 25, 2020

(54) METAL-RESIN COMPOSITE AND PREPARATION METHOD

(71) Applicant: BYD COMPANY LIMITED, Shenzhen, Guangdong (CN)

(72) Inventors: Jingna Cui, Shenzhen (CN); Xiulin Lai, Shenzhen (CN); Wenhai Luo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 112 days.

(21) Appl. No.: 15/923,585

(22) Filed: Mar. 16, 2018

(65) Prior Publication Data

US 2018/0200933 A1 Jul. 19, 2018

Related U.S. Application Data

(63) Continuation of application No. PCT/CN2016/098422, filed on Sep. 8, 2016.

(30) Foreign Application Priority Data

Sep. 25, 2015 (CN) .......................... 2015 1 0624032

(51) Int. Cl.
*B29C 45/14* (2006.01)
*B32B 15/08* (2006.01)
(Continued)

(52) U.S. Cl.
CPC ........ *B29C 45/14311* (2013.01); *B29B 11/00* (2013.01); *B32B 15/08* (2013.01); *B32B 15/18* (2013.01); *B29C 45/14795* (2013.01); *B29C 2045/14327* (2013.01); *B29C 2045/14803* (2013.01); *B29C 2045/14868* (2013.01); *B29K 2081/04* (2013.01); *B29K 2705/00* (2013.01); *B29K 2705/12* (2013.01)

(58) Field of Classification Search
None
See application file for complete search history.

(56) References Cited

U.S. PATENT DOCUMENTS 8,932,719 B2 1/2015 Naritomi
2003/0162006 A1 8/2003 Ikeguchi et al.
(Continued)

FOREIGN PATENT DOCUMENTS

| CN | 101341023 A | 1/2009 |
|---|---|---|
| CN | 101396888 A | 4/2009 |

(Continued)

OTHER PUBLICATIONS

Cairong, H. et al., Metal-Plastic Composite Structure, May 4, 2011, machine translation of CN 102039700 (Year: 2011).*

(Continued)

*Primary Examiner* — Chinessa T. Golden

(57) ABSTRACT

The present disclosure provides a metal-resin composite and a preparation method. The metal-resin composite includes a metal substrate; a porous resin layer formed on the metal substrate; a plastic layer formed on the porous resin layer; and a pore passage. The pore passage passes through the porous resin layer and extends inside the metal substrate, and the plastic layer fills in the pore passage to bond with the metal substrate.

20 Claims, 1 Drawing Sheet

(51) Int. Cl.
  *B29B 11/00* (2006.01)
  *B32B 15/18* (2006.01)
  *B29K 705/00* (2006.01)
  *B29K 81/00* (2006.01)
  *B29K 705/12* (2006.01)

(56) References Cited

U.S. PATENT DOCUMENTS

| | | |
|---|---|---|
| 2006/0257625 A1 | 11/2006 | Wakizaka |
| 2009/0008142 A1* | 1/2009 | Shimizu .................. B32B 5/18 174/261 |
| 2009/0274889 A1 | 11/2009 | Iwahashi et al. |
| 2011/0217512 A1* | 9/2011 | Heishi .................. H05K 3/381 428/141 |
| 2013/0101860 A1 | 4/2013 | Zhou |
| 2015/0183185 A1 | 7/2015 | Chang |
| 2015/0273795 A1 | 10/2015 | Koizumi |

FOREIGN PATENT DOCUMENTS

| | | | |
|---|---|---|---|
| CN | 102039700 | A  * | 5/2011 |
| CN | 102039700 | A | 5/2011 |
| CN | 103059322 | A | 4/2013 |
| CN | 103171189 | A | 6/2013 |
| CN | 104735941 | A | 6/2015 |
| CN | 104736337 | A | 6/2015 |
| CN | 104742308 | A | 7/2015 |
| EP | 1995053 | A1 | 11/2008 |
| JP | 2011-189631 | A | 9/2011 |
| TW | 201127656 | A | 8/2011 |
| WO | 2010082660 | A1 | 7/2010 |
| WO | 2015083845 | A1 | 6/2015 |

OTHER PUBLICATIONS

International Search Report and Written Opinion for Application No. PCT/CN2016/098422, dated Nov. 22, 2016, 10 pages.

Extended European Search Report dated Sep. 12, 2018, issued in related European Patent Application No. EP 16848018.4 (5 pages).

* cited by examiner

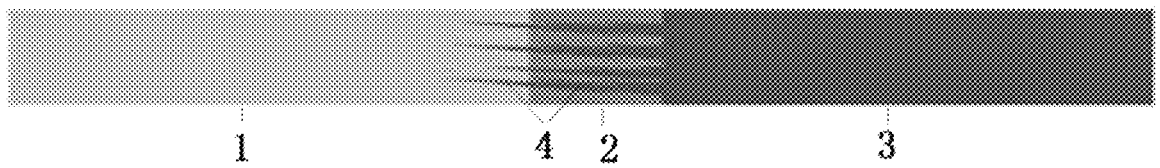

METAL-RESIN COMPOSITE AND PREPARATION METHOD

CROSS-REFERENCE TO RELATED APPLICATIONS

This application is a continuation application of International Application No. PCT/CN2016/098422, filed on Sep. 8, 2016, which is based on and claims priority to and benefits of Chinese Patent Application No. 201510624032.3, filed with the State Intellectual Property Office (SIPO) of the People's Republic of China on Sep. 25, 2015. The entire content of the above-identified applications is incorporated herein by reference.

FIELD

Embodiments of the present disclosure generally relate to a metal-resin composite and a preparation method.

BACKGROUND

To prepare an integration composite of metal and plastic, a pore is firstly made on a surface of the metal, and then a plastic is injection molded on the surface of the metal. There are three commonly used methods of preparing pores on a surface of a metal. The first one is laser engraving, which uses a laser equipment, micro-pores are produced on a surface of a metal via laser ablation through this method. The second method is nano-hole etching, which is also known as nano-injection (PMH), that is, with an opening step of anodic oxidation, plus a step of T treatment, micropores are produced on a surface of a metal. The third one is metal etching, with this method, an ink is sprayed on a surface of a metal, and part of the ink on a protective area (where no etching is needed) is cured, and then the other part of the ink, which has not been cured, is removed, and then the metal is etched with an etching solution to produce micro-pores on the surface of the metal, and finally the cured ink is removed.

Although the first method may have a good effect, its processing efficiency may be low, its equipment investment may be large, the equipment may has a short life because of overloaded operations, and the cost may be large, thus it may be difficult to apply the first method into mass production. The second method may be only suitable for some metals, such as aluminum alloy, while it is not suitable for an anti-corrosion metal, such as stainless steel, magnesium alloy. The third method generally needs a screen plate to cover part of the metal which does not need to be cured, thus its technological requirements may be high, and its technique is complex, and it may have a high cost, and an etching depth is limited. What's more, a binding strength of a composite of metal and resin obtained via these methods may still need to be improved.

SUMMARY

The present disclosure seeks to provide a metal-resin composite with improved bonding strength between metal and resin, and a method of preparing a metal-resin composite, so as to improve a binding force between the metal substrate and plastic layer.

Thus, embodiments of a first aspect of the present disclosure provide a metal-resin composite. The metal-resin composite includes a metal substrate; a porous resin layer formed on the metal substrate; a plastic layer formed on the porous resin layer; and a pore passage. The pore passage passes through the porous resin layer and extends inside the metal substrate, and the plastic layer fills in the pore passage to bond with the metal substrate.

Embodiments of a second aspect of the present disclosure provide a method of preparing the metal-resin composite mentioned above, includes steps of:

forming a porous resin layer on a metal substrate to obtain a metal substrate formed with porous resin layer;

contacting the metal substrate formed with porous resin layer with an etching solution so as to form a pore passage; and forming a plastic layer on the porous resin layer;

wherein the pore passage passes through the porous resin layer and extends inside the metal substrate, and the plastic layer fills in the pore passage to bond with the metal substrate.

According to the metal-resin composite of the present disclosure, the pore passage passes through the porous resin layer and extends inside the metal substrate, and the plastic layer fills in the pore passage to bond with the metal substrate, therefore a binding force between the metal substrate and the plastic layer may be greatly improved.

The metal-resin composite of the present disclosure may have a great binding force between the metal substrate and the plastic layer, thus it may especially be suitable for a high strength structural component, part of which may be nonconductive, such as a cell phone housing.

With the method of preparing metal-resin composite according to the present disclosure, there is no step of removing the porous resin layer, thus the method may be simplified.

These and other aspects and advantages of embodiments of the present disclosure will be described in detail with reference to the following detailed description.

BRIEF DESCRIPTION OF THE DRAWINGS

The drawings are used for further comprehending the present disclosure, it should constitute as one part of the description, and be used to explain the present disclosure together with the DETAILED DESCRIPTION, however it should not be constructed as limitations to the present disclosure.

FIG. 1 is a sectional view of a metal-resin composite of Embodiment 1 of the present disclosure.

| References | | | |
|---|---|---|---|
| 1 | metal substrate | 2 | porous resin layer |
| 3 | plastic layer | 4 | pore passage |

DETAILED DESCRIPTION

Reference will be made in detail to embodiments of the present disclosure. The embodiments described herein are explanatory and illustrative, which are used to generally understand the present disclosure. The embodiments shall not be construed to limit the present disclosure.

As shown in FIG. 1, one embodiment of the present disclosure provides a metal-resin composite, which includes a metal substrate 1; a porous resin layer 2 formed on the metal substrate 1; a plastic layer 3 formed on the porous resin layer 2; and a pore passage 4. The pore passage 4 passes through the porous resin layer 2 and extends inside the metal substrate 1, and the plastic layer 3 fills in the pore passage 4 to bond with the metal substrate 1.

In the present disclosure, with the pore passage 4 passing through the porous resin layer 2 and extending inside the metal substrate 1, the plastic layer 3 fills in the pore passage 4 to bond with the metal substrate 1, such that a binding force between the metal substrate 1 and the plastic layer 3 may be greatly improved.

In embodiments of the present disclosure, the metal substrate may be made of aluminum, aluminum alloy, stainless steel, magnesium or magnalium alloy. In one embodiment, the metal substrate is made of aluminum alloy.

The metal-resin composite is used as a mobile phone housing, in which the metal-resin composite has a thickness of about 0.10 millimeters to about 8 millimeters.

The porous resin layer may have a thickness of about 5 microns to about 100 microns. In some specific embodiments, the porous resin layer has a thickness of about 10 microns to about 60 microns.

The porous resin layer may have a tensile strength greater than 20 Mpa, for example, about 25 Mpa to about 60 Mpa, then a binding force between the metal substrate and plastic layer may be improved.

The porous resin layer may be formed by heating and curing an adhesive resin composition under vacuum, and the adhesive resin composition includes an adhesive resin, a curing agent, a coupling agent and a solvent. Then a strength and corrosion resistance of the porous resin layer may be improved.

In some embodiments of the present disclosure, based on 100 weight parts of the adhesive resin, the curing agent has a content of about 5 weight parts to about 50 weight parts, the coupling agent has a content of about 0.3 weight parts to 18 weight parts, the solvent has a content of about 5 weight parts to about 200 weight parts. In some other embodiments of the present disclosure, based on 100 weight parts of the adhesive resin, the curing agent has a content of about 5 weight parts to about 26 weight parts, the coupling agent has a content of about 0.5 weight parts to 13 weight parts, the solvent has a content of about 5 weight parts to about 110 weight parts. In some other embodiments of the present disclosure, based on 100 weight parts of the adhesive resin, the curing agent has a content of about 6 weight parts to about 25 weight parts, the coupling agent has a content of about 1 weight part to 13 weight parts, the solvent has a content of about 10 weight parts to about 100 weight parts. Then the strength and corrosion resistance of the porous resin layer may be further improved.

The adhesive resin is at least one selected from a group consisting of epoxy resin, urea resin, polysulfone resin and phenolic resin. In some specific embodiments of the present disclosure, the adhesive resin is at least one selected from a group consisting of epoxy resin and polysulfone resin.

The curing agent is at least one selected from a group consisting of organic acid anhydride, dicyandiamide, amino resin and thermosetting acrylic resin. In some other embodiments of the present disclosure, the curing agent may be selected from a group consisting of organic acid anhydride, amino resin and dicyandiamide. In some other embodiments of the present disclosure, the curing agent is methylhexahydrophthalic anhydride.

The coupling agent is at least one selected from a group consisting of silane coupling agent, titanate coupling agent, bimetallic coupling agent, phosphate coupling agent, borate coupling agent and chrome complex. In some other embodiments of the present disclosure, the coupling agent is at least one selected from a group consisting of silane coupling agent, titanate coupling agent and aluminate coupling agent.

The silane coupling agent is at least one selected from a group consisting of γ-aminopropyltriethoxysilane, γ-methacryloxypropyltrimethoxysilane, γ-Glycidoxypropyltrimethoxysilane, vinyltrimethoxysilane and N-[3-(Trimethoxysilyl)propyl]ethylenediamine.

The titanate coupling agent is at least one selected from a group consisting of isopropyl tri(dioctylpyrophosphate) titanate, isopropyl tri(dioctylphosphate)titanate, isopropyl dioleic(dioctylphosphate) titanate, mono alkoxy monounsaturated fatty acid titanate and Bis(P,P-bis-ethylhexyl diphosphato)ethanediolato titanate.

The bimetallic coupling agent is at least one selected from a group consisting of Zr—Al coupling agent and Al—Ti coupling agent.

In some embodiments of the present disclosure, the phosphate coupling agent is at least one selected from a group consisting of mono alkoxy monounsaturated fatty acid titanate and isopropyl dioleic(dioctylphosphate) phosphate.

The borate coupling agent is at least one selected from a group consisting of mono alkyl borate coupling agent and chelate coordinate borate coupling agent.

The solvent, which is used for adjusting a mobility and levelling property of the adhesive and for generating pores, is at least one selected from a group consisting of butyl acetate, ethyl acetate, ethyl alcohol, xylene, methyl isobutyl ketone and isopropanol. In some other embodiments of the present disclosure, the solvent is at least one selected from a group consisting of ethyl acetate, ethyl alcohol and isopropanol.

The pore passage has a pore diameter of about 0.1 microns to about 20 microns, for example, about 0.5 microns to about 15 microns, then a binding force between the metal substrate and plastic layer may be further improved. The pore diameter of the pore passage refers to a pore size of the pore passage on the surface of the porous resin layer.

The pore passage passes through the porous resin layer and extends inside the metal substrate, and the plastic layer fills in the pore passage to bond with the metal substrate. Then a binding force between the metal substrate and the plastic layer may be improved.

In some embodiments of the present disclosure, a depth that the pore passage extends inside the metal substrate is about 5 microns to about 200 microns, for example, about 10 microns to about 100 microns, then the binding force between the metal substrate and the plastic layer may be further improved.

In some embodiments of the present disclosure, the plastic layer has a thickness of about 5 microns to about 100 microns, for example, about 10 microns to about 60 microns. It should be understood that the thickness of the plastic layer does not include a thickness of the plastic layer that extends in the pore passage.

In some embodiments of the present disclosure, the plastic layer is formed by injection molding a resin composition on the porous rein layer. A resin in the resin composition is at least one selected from a group consisting of, but not limited to, polyolefin(such as polystyrene, polyethylene, polyvinyl chloride, polypropylene, polymethyl methacrylate and poly (acrylonitrile-butadiene-styrene)), polycarbonate, polyester(such as poly(ethylene terephthalate-co-1,4-cyclohexylene dimethylene terephthalate), polydiallylisophthalate, Poly (diallyl phthalate), polyethylene naphthalate, polyethylene terephthalate and polybutylene terephthalate), polyamide(such as polyhexamethylene adipamide, polyazyl-hexamethylenediamine, polysuccinylhexanediamine, polyhexamethylene dodecanamide, polyhexamethylene sebacamide, poly(decamethylene sebacamide), polyundecanoylamide, polylauryllactam, polycapryllactam, poly9-amino nonanoic acid, polycaprolactam, polyphenylene diamine, polyphthalate hexamethylenediamine, polybenzoyl hexanediamine, and polyphenylene diamine), polyaromatic ether, polyether imide, polyphenyl ether, polyphenylene sulfide, polyimide, polysulfone, polyether ketone and polyurethane. In some specific embodiments, the resin is at least one selected from a group consisting of polyimide, polyphenylene sulfide and polybutylene terephthalate.

In some embodiments of the present disclosure, the resin in the resin composition has a content of about 50 wt % to about 100 wt %, for example, about 70 wt % to about 85 wt %.

The resin composition may include at least one assistant, such as filler, antioxygen, light stabilizer and lubricant, so as to improve performance of the plastic layer obtained from the resin composition, or provide a new property to the plastic layer.

The filler may include glass fiber and/or carbon fiber, then a thermal expansion coefficient may be regulated.

The antioxygen may include a primary antioxygen and an auxiliary antioxygen. In some embodiments of the present disclosure, a weight ratio of the primary antioxygen to the auxiliary antioxygen is 1:1-4. In some embodiments of the present disclosure, the primary antioxygen is hindered phenolic antioxygen, of which a specific example may be, but not limited to, antioxygen 1098 and antioxygen 1010. A main ingredient of the antioxygen 1098 is N,N'-Hexane-1,6-diylbis[3-(3,5-di-tert-butyl-4-hydroxyphenylpropionamide], and a main ingredient of the antioxygen 1010 is pentaerythritol tetrakis [3-(3,5-di-tert-butyl-4-hydroxyphenyl)-propionate]. In some embodiments of the present disclosure, the auxiliary antioxygen includes phosphite ester-type antioxygen, of which a specific example may be, but not limited to, antioxygen 168, of which a main ingredient is tris-(2,4-di-tert-butyl-pheny)-phosphite. Then, an antioxygenic property of a plastic article obtained from the resin composition may be improved, thus resulting in improved service life.

The light stabilizer includes a hindered amine light stabilizers, of which a specific example may be, but not limited to, bis(2,2,6,6-tetramethyl-4-piperidyl)sebacate.

The lubricant is at least one selected from a group consisting of copolymerization wax of ethylene/vinyl acetate (EVA wax), polyethylene wax (PE wax) and stearate, then a flowing property of polymer may be improved.

In some embodiments of the present disclosure, based on the weight of the resin composition, the filler has a content of about 30 wt % to about 50 wt %, the antioxygen has a content of about 0.3 wt % to about 1 wt %, the light stabilizer has a content of about 0.2 wt % to about 1 wt %, and the lubricant has a content of about 0.1 wt to about 1 wt %.

Embodiments of another aspect of the present disclosure provide a method of preparing the metal-resin composite mentioned above, includes steps of:
forming a porous resin layer on a metal substrate to obtain a metal substrate formed with porous resin layer;
contacting the metal substrate formed with porous resin layer with an etching solution so as to form a pore passage; and
forming a plastic layer on the porous resin layer;
wherein the pore passage passes through the porous resin layer and extends inside the metal substrate, and the plastic layer fills in the pore passage to bond with the metal substrate.

The metal substrate may be made of aluminum, aluminum alloy, stainless steel, magnesium or magnalium alloy. In some specific embodiments of the present disclosure, the metal substrate is made of aluminum alloy or stainless steel.

Prior to the step of forming the porous resin layer, the method may include a step of cleaning the metal substrate. In some specific embodiments of the present disclosure, the metal substrate is cleaned with a hydroxide sodium solution, of which a concentration of hydroxide sodium is 60 g/L, under a temperature of about 40 Celsius degrees to about 60 Celsius degrees.

The step of forming the porous resin layer on the metal substrate includes: coating an adhesive resin composition on the metal substrate, and heating and curing the adhesive resin composition under vacuum so as to form the porous resin layer.

A condition of heating and curing the adhesive resin composition under vacuum so as to form the porous resin layer includes: a vacuum degree of about 20 Pa to about 300 Pa, a curing temperature of about 90 Celsius degrees to about 180 Celsius degrees. In some other embodiments of the present disclosure, a condition of heating and curing the adhesive resin composition under vacuum so as to form the porous resin layer includes: a vacuum degree of about 90 Pa to about 110 Pa, a curing temperature of about 130 Celsius degrees to about 180 Celsius degrees.

The adhesive resin composition includes an adhesive resin, a curing agent, a coupling agent and a solvent. In some embodiments of the present disclosure, based on 100 weight parts of the adhesive resin, the curing agent has a content of about 5 weight parts to about 50 weight parts, the coupling agent has a content of about 0.3 weight parts to 18 weight parts, the solvent has a content of about 5 weight parts to about 200 weight parts. In some other embodiments of the present disclosure, based on 100 weight parts of the adhesive resin, the curing agent has a content of about 5 weight parts to about 26 weight parts, the coupling agent has a content of about 0.5 weight parts to 13 weight parts, the solvent has a content of about 5 weight parts to about 110 weight parts. In some other embodiments of the present disclosure, based on 100 weight parts of the adhesive resin, the curing agent has a content of about 6 weight parts to about 25 weight parts, the coupling agent has a content of about 1 weight parts to 13 weight parts, the solvent has a content of about 10 weight parts to about 100 weight parts. Then the strength and corrosion resistance of the porous resin layer may be further improved.

The adhesive resin is at least one selected from a group consisting of epoxy resin, urea resin, polysulfone resin and phenolic resin. In some specific embodiments of the present disclosure, the adhesive resin is at least one selected from a group consisting of epoxy resin and polysulfone resin.

The curing agent is at least one selected from a group consisting of organic acid anhydride, dicyandiamide, amino resin and thermosetting acrylic resin. In some other embodiments of the present disclosure, the curing agent is at least one selected from a group consisting of organic acid anhydride, amino resin and dicyandiamide.

The coupling agent is at least one selected from a group consisting of silane coupling agent, titanate coupling agent, bimetallic coupling agent, phosphate coupling agent, borate coupling agent and chrome complex. In some other embodiments of the present disclosure, the coupling agent is at least one selected from a group consisting of silane coupling agent, titanate coupling agent and aluminate coupling agent.

The silane coupling agent is at least one selected from a group consisting of γ-aminopropyltriethoxysilane, aminopropyltriethoxysilane, 3-methacryloxypropyltrimethoxysilane, 3-methacryloxypropyltrimethoxysilane, vinyltrimethoxysilane and N-[3-(Trimethoxysilyl)propyl] ethylenediamine.

The titanate coupling agent is at least one selected from a group consisting of isopropyl tri(dioctylpyrophosphate) titanate, isopropyl tri(dioctylphosphate)titanate, isopropyl dioleic(dioctylphosphate) titanate, mono-alkoxy unsaturated aliphatic acid titanate and bis(P,P-bis-ethylhexyl diphosphato)ethanediolato titanate.

The bimetallic coupling agent is at least one selected from a group consisting of Zr—Al coupling agent and Al—Ti coupling agent.

The phosphate coupling agent is at least one selected from a group consisting of mono-alkoxy unsaturated aliphatic acid phosphate and Isopropyl dioleic(dioctylphosphate) phosphate.

The borate coupling agent is at least one selected from a group consisting of monoalkyl borate coupling agent and chelate-coordination compound borate coupling agent.

The solvent, which is used for adjusting a mobility and levelling property of the adhesive and for generating pores, is at least one selected from a group consisting of butyl acetate, ethyl acetate, ethyl alcohol, xylene, methyl isobutyl ketone and isopropanol. In some other embodiments of the present disclosure, the solvent is at least one selected from a group consisting of ethyl acetate, ethyl alcohol and isopropanol.

The adhesive resin composition may be coated on the metal substrate via printing, spraying, brush coating or spin coating. Specifically, a thickness of the coating of the adhesive resin composition is determined such that a thickness of the porous resin layer obtained after curing is about 5 microns to about 100 microns, for example, the thickness of the coating of the adhesive resin composition is determined such that the thickness of the porous resin layer obtained after curing is about 10 microns to about 60 microns.

According to the method of the present disclosure, with the specific adhesive resin composition, the porous resin layer has a tensile strength greater than 20 Mpa, for example, about 25 Mpa to about 60 Mpa.

According to the method of the present disclosure, during the step of contacting the metal substrate formed with porous resin layer with an etching solution, the etching solution enters into a first pore of the porous resin layer and then contacts with the metal substrate, such that a second pore formed on the surface of the metal substrate, the first pore and the second pore are in communicated with each other so as to form the pore passage.

The etching solution is, such as, a mixture of concentrated hydrochloric acid, concentrated nitric acid, glacial acetic acid, hydrofluoric acid, and disodium phosphate dodecahydrate, a mixture of concentrated hydrochloric acid, concentrated nitric acid, nickel chloride and ferric trichloride, and a mixture of ferric trichloride, hydrogen peroxide and hydrofluoric acid. In one embodiment of the present disclosure, the etching solution is a mixture of ferric trichloride, hydrogen peroxide and hydrofluoric acid, of which a weight of ferric trichloride, hydrogen peroxide and hydrofluoric acid is 1:0.10-0.50, such as 1:0.15-0.55.

The etching solution is a mixture of ferric trichloride, hydrogen peroxide and hydrofluoric acid, and a weight ratio of ferric trichloride (30-42)°Bé, hydrogen peroxide and hydrofluoric acid is 67:16:17.

The step of contacting the metal substrate formed with porous resin layer with an etching solution is performed under a temperature of about 30 Celsius degrees to about 70 Celsius degrees for about 10 minutes to about 60 minutes. In some other embodiments of the present disclosure, the step of contacting the metal substrate formed with porous resin layer with an etching solution is performed under a temperature of about 40 Celsius degrees to about 60 Celsius degrees for about 20 minutes to about 40 minutes.

The pore passage has a pore diameter of about 0.1 microns to about 20 microns (for example, about 0.5 microns to about 15 microns).

It should be noted that, the pore diameter of the pore passage refers to a pore diameter of a pore of the pore passage on the surface of the porous resin layer. In some embodiments, a depth that the pore passage extends inside the metal substrate is about 1 microns to about 200 microns, such as about 10 microns to about 100 microns.

A protective film may be formed on a surface of an area of the metal substrate where no porous resin layer is formed, therefore a second pore may be prevented from being produced on the surface of the area of the metal substrate (where no porous resin layer is formed on). Specifically, for example, a protective film may be formed via pasting or spraying protective glue on a non-etching area surface of the metal substrate. In some embodiments, the protective glue includes liquid UV protective glue or silica gel. In one embodiment of the present disclosure, the liquid UV protective glue is, for example, liquid anode protective glue purchased from Shenzhen Huihongxing Chemical company.

The plastic layer is formed on the porous resin layer via injection molding a resin composition.

The resin in the resin composition may be thermoplastic resin, and also, the resin in the resin composition may be thermosetting resin. For example, the resin composition is at least one selected from a group consisting of, but not limited to, polyolefin(such as, polystyrene, polyethylene, polyvinyl chloride, polypropylene, polymethyl methacrylate, and poly (acrylonitrile-butadiene-styrene)), polycarbonate, polyester (such as poly(ethylene terephthalate-co-1,4-cyclohexylene dimethylene terephthalate), polydiallylisophthalate, poly(diallyl terephthalate), polybutylene naphthalate, polyethylene terephthalate, and polybutylene terephthalate), polyamide (such as, polyhexamethylene adipamide, PA69, PA46, polyhexamethylene dodecanamide, PA610, PA1010, polyundecanoylamide, PA12, PA8, PA9, polycaprolactam, poly-p-phenylene terephthamide, poly-m-phenylene adipamide, PA6T, and poly-p-phenylene terephthamide), polyaromatic ether, polyether imide, polyphenyl ether, polyphenylene sulfide, polyimide, polysulfone, polyether ketone and polyurethane. In some specific embodiments, the resin is at least one selected from a group consisting of polyimide, polyphenylene sulfide and polybutylene terephthalate.

In some embodiments of the present disclosure, the resin in the resin composition has a content of about 50 wt % to about 100 wt %, for example, about 70 wt % to about 85 wt %.

The resin composition may include at least one assistant, such as filler, antioxygen, light stabilizer and lubricant, so as to improve performance of the plastic layer obtained from the resin composition, or provide a new property to the plastic layer.

The filler may include glass fiber and/or carbon fiber, then a thermal expansion coefficient may be regulated.

The antioxygen includes a primary antioxygen and an auxiliary antioxygen. In some embodiments of the present disclosure, a weight ratio of the primary antioxygen to the auxiliary antioxygen is 1:1-4. In some embodiments of the present disclosure, the primary antioxygen is hindered phenolic antioxygen, of which a specific example may be, but not limited to, antioxygen 1098 and antioxygen 1010. A main ingredient of the antioxygen 1098 is N,N'-Hexane-1,6-diylbis[3-(3,5-di-tert-butyl-4-hydroxyphenylpropionamide], and a main ingredient of the antioxygen 1010 is pentaerythritol tetrakis [3-(3,5-di-tert-butyl-4-hydroxyphenyl)-propionate]. In some embodiments of the present disclosure, the auxiliary antioxygen includes phosphite ester-type antioxygen, of which a specific example may be, but not limited to, antioxygen 168, of which a main ingredient is tris-(2,4-di-tert-butyl-pheny)-phosphite. Then, an antioxygenic property of a plastic article obtained from the resin composition may be improved, thus resulting in improved service life.

The light stabilizer includes a hindered amine light stabilizers, of which a specific example may be, but not limited to, bis(2,2,6,6-tetramethyl-4-piperidyl)sebacate.

The lubricant is at least one selected from a group consisting of copolymerization wax of ethylene/vinyl acetate (EVA wax), polyethylene wax (PE wax) and stearate, then a flowing property of polymer may be improved.

In some embodiments of the present disclosure, based on the weight of the resin composition, the filler has a content of about 30 wt % to about 50 wt, the antioxygen has a content of about 0.3 wt % to about 1 wt %, the light stabilizer has a content of about 0.2 wt % to about 1 wt %, and the lubricant has a content of about 0.1 wt to about 1 wt %.

In some embodiments of the present disclosure, a condition of injection molding includes: a mold temperature of about 100 Celsius degrees to about 250 Celsius degrees, a maintaining pressure of about 40 Mpa to 250 Mpa. In some other embodiments of the present disclosure, a condition of injection molding includes: a mold temperature of about 120 Celsius degrees to about 220 Celsius degrees, a maintaining pressure of about 80 Mpa to 200 Mpa.

Detailed descriptions of the present disclosure will be given below by referring to Embodiment, but not limited to those Embodiments.

Preparing Embodiments 1-3

A solvent is stirred in a high-speed dispersion machine for 15 minutes under a rotation speed of 500 r/min, then an adhesive resin, a curing agent and a coupling agent are added in the high-speed dispersion machine and stirred for 30 minutes under a rotation speed of 1500 r/min, thus to obtain a coating material S1-S3.

The above mentioned components and their dosage are shown in Table 1.

In table 1:

The epoxy resin is 6828 purchased from Shanghai Xinhua resin factory.

The polysulfone resin is PSU 2010 purchased from Nobelium erbium fluoride silicon high polymer material company.

The methyl tetrahydrophthalic anhydride SMS-01 is purchased from Jiangsu Sanmu Chem. Co. LTD.

The amino resin BR-167LF is purchased from Taiwan Changchun Chemical company.

The dicyandiamide Dicyanex 1400HF is purchased from American Air Products.

The coupling agent A1100, which includes γ-aminopropyltriethoxysilane, is purchased from American Union Carbide Corporation.

The coupling agent A-6011, which includes γ-aminopropyltriethoxysilane, is purchased from American Air Products.

Embodiment 1

(1) A stainless steel (which includes a hole having a diameter of 6 millimeters thereon, a size of metal element to be bond is 80 mm×16 mm×5 mm, and an injection molding area is 16 mm×5 mm=80 mm$^2$) is dipped in a 60 g/L sodium hydroxide aqueous solution under a temperature of 40 Celsius degrees for 50 seconds, and then washed by water and dried.

(2) A coating material S1 is coated on an injection molding surface (corrosion region) of the stainless steel, the thickness of the coating material coated on the stainless steel is determined such that a thickness after being cured is 10 microns.

(3) The stainless steel coated with the coating material is placed in a vacuum furnace, then the vacuum furnace is vacuumed (a vacuum degree is 100 Pa) and heated to 150 Celsius degrees, and rested for 90 minutes to obtain a stainless steel X1 including a porous resin layer.

(4) A liquid anodic protection adhesive (purchased from Shenzhen Huihongxing Chemical company) is sprayed on a non-injection molding surface of the stainless steel to form a protective film, thus to obtain a stainless steel Y1.

(5) The stainless steel Y1 is placed in a chemical etching solution (ferric trichloride 35° Bé:hydrogen peroxide:hydrofluoric acid=67:16:17 (weight ratio)) under a temperature of 45 Celsius degrees for 30 minutes to obtain a porous stainless steel Z1.

(6) The protective film is peeled off to obtain a porous stainless steel G1.

(7) The porous stainless steel G1 is placed in an injection molding machine under a mold temperature of 140 Celsius

TABLE 1

|  | Preparing Embodiment 1 | Preparing Embodiment 2 | Preparing Embodiment 3 |
| --- | --- | --- | --- |
| adhesive resin | epoxy resin (100 weight parts) | epoxy resin (100 weight parts) | epoxy resin + polysulfone resin (100 weight parts) |
| curing agent | methyl tetrahydrophthalic anhydride (7 weight parts) | amino resin BR-167LF (6 weight parts) | dicyandiamide Dicyanex 1400HF (25 weight parts) |
| coupling agent | A1100 (1 weight part) | Z-6011 (13 weight parts) | A1100 (8 weight parts) |
| solvent | ethyl alcohol + butyl acetate (5 + 5 weight parts) | ethyl acetate + isopropanol (30 + 70 weight parts) | butyl acetate + ethyl acetate (40 + 15 weight parts) | degrees and a molding pressure of 150 MPa, a composite material (1140T, purchased from Japan Polyplastics) including polyphenylene sulfide and fibre is injection molded on the surface of the porous stainless steel G1 to obtain a metal-resin composite A1.

Through cutting profile, observation via microscope, the metal-resin composite A1 obtained has a structure: a porous resin layer formed on the metal substrate, plastic layer formed on the porous resin layer, a second pore formed on the surface of the metal substrate and a first pore of the pore resin layer define a pore passage, and the plastic layer fills in the pore passage to bond with the metal substrate. A depth that the pore passage extends inside the metal substrate is 30 microns, and a pore diameter of the pore passage on the surface of the porous resin layer is 5 microns.

Embodiment 2

(1) A stainless steel (which includes a hole having a diameter of 6 millimeters thereon, a size of metal element to be bond is 80 mm×16 mm×5 mm, and an injection molding area is 16 mm×5 mm=80 mm$^2$) is dipped in a 60 g/L sodium hydroxide aqueous solution under a temperature of 40 Celsius degrees for 50 seconds, and then washed by water and dried.

(2) A coating material S2 is coated on an injection molding surface (corrosion region) of the stainless steel, the thickness of the coating material coated on the stainless steel is determined such that a thickness after being cured is 50 microns.

(3) The stainless steel coated with the coating material is placed in a vacuum furnace, then the vacuum furnace is vacuumed (a vacuum degree is 100 Pa) and heated to 130 Celsius degrees, and rested for 30 minutes to obtain a stainless steel X2 including a porous resin layer.

(4) A liquid anodic protection adhesive(purchased from Shenzhen Huihongxing Chemical company) is sprayed on a non-injection molding surface of the stainless steel to form a protective film, thus to obtain a stainless steel Y2.

(5) The stainless steel Y2 is placed in a chemical etching solution (ferric trichloride 35° Bé:hydrogen peroxide:hydrofluoric acid=67:16:17 (weight ratio)) under a temperature of 40 Celsius degrees for 20 minutes to obtain a porous stainless steel Z2.

(6) The protective film is peeled off to obtain a porous stainless steel G2.

(7) The porous stainless steel G2 is placed in an injection molding machine under a mold temperature of 140 Celsius degrees and a molding pressure of 150 MPa, a composite material (1140T, purchased from Japan Polyplastics) including polyphenylene sulfide and fibre is injection molded on the surface of the porous stainless steel G1 to obtain a metal-resin composite A2.

Through cutting profile, observation via microscope, the metal-resin composite A2 obtained has a structure: a porous resin layer formed on the metal substrate, plastic layer formed on the porous resin layer, a second pore formed on the surface of the metal substrate and a first pore of the pore resin layer define a pore passage, and the plastic layer fills in the pore passage to bond with the metal substrate. A depth that the pore passage extends inside the metal substrate is 10 microns, and a pore diameter of the pore passage on the surface of the porous resin layer is 0.5 microns.

Embodiment 3

(1) A stainless steel (which includes a hole having a diameter of 6 millimeters thereon, a size of metal element to be bond is 80 mm×16 mm×5 mm, and an injection molding area is 16 mm×5 mm=80 mm$^2$) is dipped in a 60 g/L sodium hydroxide aqueous solution under a temperature of 40 Celsius degrees for 50 seconds, and then washed by water and dried.

(2) A coating material S3 is coated on an injection molding surface (corrosion region) of the stainless steel, the thickness of the coating material coated on the stainless steel is determined such that a thickness after being cured is 60 microns.

(3) The stainless steel coated with the coating material is placed in a vacuum furnace, then the vacuum furnace is vacuumed (a vacuum degree is 100 Pa) and heated to 180 Celsius degrees, and rested for 100 minutes to obtain a stainless steel X3 including a porous resin layer.

(4) A liquid anodic protection adhesive(purchased from Shenzhen Huihongxing Chemical company) is sprayed on a non-injection molding surface of the stainless steel to form a protective film, thus to obtain a stainless steel Y3.

(5) The stainless steel Y3 is placed in a chemical etching solution (ferric trichloride 35° Bé:hydrogen peroxide:hydrofluoric acid=67:16:17 (weight ratio)) under a temperature of 60 Celsius degrees for 40 minutes to obtain a porous stainless steel Z3.

(6) The protective film is peeled off to obtain a porous stainless steel G3.

(7) The porous stainless steel G3 is placed in an injection molding machine under a mold temperature of 140 Celsius degrees and a molding pressure of 150 MPa, a composite material (1140T, purchased from Japan Polyplastics) including polyphenylene sulfide and fibre is injection molded on the surface of the porous stainless steel G1 to obtain a metal-resin composite A3.

Through cutting profile, observation via microscope, the metal-resin composite A3 obtained has a structure: a porous resin layer formed on the metal substrate, plastic layer formed on the porous resin layer, a second pore formed on the surface of the metal substrate and a first pore of the pore resin layer define a pore passage, and the plastic layer fills in the pore passage to bond with the metal substrate. A depth that the pore passage extends inside the metal substrate is 100 microns, and a pore diameter of the pore passage on the surface of the porous resin layer is 15 microns.

Embodiment 4

A metal-resin composite A4 is obtained via a same method as Embodiment 1, except that: the coating material S1 is replaced with S2.

Embodiment 5

A metal-resin composite A4 is obtained via a same method as Embodiment 1, except that: the coating material S1 is replaced with S3.

Comparative Embodiment 1

A metal-resin composite D1 is obtained via a same method as Embodiment 1, except that: no porous resin layer is formed.

Test Embodiment 2

These metal-resin composite A1-A5 and D1 are tested on a universal material testing machine (E42.503, purchased from MTS Systems Corporation (China)) under a pulling speed of 100 millimeters per minute, a maximum force when the metal element is separated is recorded, and a pull strength is calculated via dividing the maximum force by binding area (namely 80 mm$^2$), the test results are recorded in Table 2.

TABLE 2

|  | pull strength (Mpa) |
|---|---|
| A1 | 32.42 |
| A2 | 33.19 |
| A3 | 33.83 |
| A4 | 31.14 |
| A5 | 30.28 |
| D1 | 3.4 |

Although explanatory embodiments stated above have been shown and described in detail, the present disclosure may not be limited to those details described in these embodiments, various simple modifications could be made within technical spirit and principles of the present disclosure, those simple modifications all fall into the protection scope of the present disclosure.

In addition, it should be noted that, each specific technical feature described in these embodiments stated above, under no contradiction, could be combined via any appropriate manner, in order to avoid unnecessary repetition, various possible combination manners are not illustrated in the present disclosure.

In addition, each different embodiment of the present disclosure could also be combined with each other without departing from spirit and principles of the present disclosure, which should also be deemed as content of present disclosure.

What is claimed is:

1. A metal-resin composite, comprising:
    a metal substrate having a first surface and a second surface;
    a porous resin layer formed on the first surface of the metal substrate;
    a plastic layer formed on the porous resin layer; and
    a pore passage;
    wherein the pore passage passes through the porous resin layer and the first surface of the metal substrate and ends between the first surface and the second surface of the metal substrate, and the plastic layer fills in the pore passage to bond with the metal substrate.

2. The metal-resin composite of claim 1, wherein the pore passage has a pore passage diameter of about 0.1 microns to about 20 microns, and extends into the metal substrate with a depth of about 5 microns to about 200 microns.

3. The metal-resin composite of claim 1, wherein the metal substrate is made of aluminum, aluminum alloy, stainless steel, magnesium, or magnalium alloy.

4. The metal-resin composite of claim 1, wherein the porous resin layer is formed by heating and curing an adhesive resin composition under vacuum, and the adhesive resin composition comprises an adhesive resin, a curing agent, a coupling agent and a solvent.

5. The metal-resin composite of claim 4, wherein based on 100 weight parts of the adhesive resin, the curing agent has a content of about 5 weight parts to about 50 weight parts, the coupling agent has a content of about 0.3 weight parts to 18 weight parts, and the solvent has a content of about 5 weight parts to about 200 weight parts.

6. The metal-resin composite of claim 4, wherein the adhesive resin is at least one selected from a group consisting of epoxy resin, urea resin, polysulfone resin and phenolic resin.

7. The metal-resin composite of claim 4, wherein the curing agent is at least one selected from a group consisting of organic acid anhydride, dicyandiamide, amino resin and thermosetting acrylic resin.

8. The metal-resin composite of claim 4, wherein the coupling agent is at least one selected from a group consisting of silane coupling agent, titanate coupling agent, bimetallic coupling agent, phosphate coupling agent, borate coupling agent and chrome complex.

9. The metal-resin composite of claim 4, wherein the solvent is at least one selected from a group consisting of butyl acetate, ethyl acetate, ethyl alcohol, xylene, methyl isobutyl ketone and isopropanol.

10. The metal-resin composite of claim 1, wherein the plastic layer is made of a resin composition, and a resin in the resin composite is at least one selected from a group consisting of polyolefin, polycarbonate, polyester, polyamide, polyaromatic ether, polyether imide, polyphenyl ether, polyphenylene sulfide, polyimide, polysulfone, polyether ketone and polyurethane.

11. A method of preparing a metal-resin composite, comprising:
    forming a porous resin layer on a first surface of a metal substrate to obtain a metal substrate formed with a porous resin layer, wherein the metal substrate has the first surface and a second surface;
    forming a pore passage by etching the metal substrate formed with the porous resin layer; and
    forming a plastic layer on the porous resin layer;
    wherein the pore passage passes through the porous resin layer and the first surface of the metal substrate and ends between the first surface and the second surface of the metal substrate, and the plastic layer fills in the pore passage to bond with the metal substrate.

12. The method of claim 11, wherein forming the porous resin layer on the first surface of the metal substrate further comprises:
    coating an adhesive resin composition on the metal substrate, and heating and curing the adhesive resin composition under vacuum to form the porous resin layer, wherein the adhesive resin composition comprises an adhesive resin, a curing agent, a coupling agent and a solvent.

13. The method of claim 12, wherein based on 100 weight parts of the adhesive resin, the curing agent has a content of about 5 weight parts to about 50 weight parts, the coupling agent has a content of about 0.3 weight parts to 18 weight parts, and the solvent has a content of about 5 weight parts to about 200 weight parts.

14. The method of claim 12, wherein the adhesive resin is at least one selected from a group consisting of epoxy resin, urea resin, polysulfone resin and phenolic resin.

15. The method of claim 12, wherein the curing agent is at least one selected from a group consisting of organic acid anhydride, dicyandiamide, amino resin and thermosetting acrylic resin.

16. The method of claim 12, wherein the coupling agent is at least one selected from a group consisting of silane coupling agent, titanate coupling agent, bimetallic coupling agent, phosphate coupling agent, borate coupling agent and chrome complex.

17. The method of claim 12, wherein the solvent is at least one selected from a group consisting of butyl acetate, ethyl acetate, ethyl alcohol, xylene, methyl isobutyl ketone and isopropanol.

18. The method of claim 11, wherein the pore passage has a pore passage diameter of about 0.1 microns to about 20 microns and extends into the metal substrate with a depth of about 5 microns to about 200 microns.

19. The method of claim 11, wherein the metal substrate is made of aluminum, aluminum alloy, stainless steel, magnesium or magnalium alloy.

20. The method of claim 11, wherein forming the plastic layer on the porous resin layer comprises injection molding a resin composition on the porous rein layer, and a resin in the resin composite is at least one selected from a group consisting of polyolefin, polycarbonate, polyester, polyamide, polyaromatic ether, polyether imide, polyphenyl ether, polyphenylene sulfide, polyimide, polysulfone, polyether ketone and polyurethane.

* * * * *